United States Patent Office 3,478,257
Patented Nov. 11, 1969

3,478,257
CONTROL CIRCUIT FOR MULTIPHASE RECTIFIERS BY SENSING OF THYRISTOR'S CONTROL ELECTRODE VOLTAGE
Ladislav Kýr, Plumlov, and Jiří Voleník and František Raba, Plzen, Czechoslovakia, assignors to Skoda oborovy podnik, Plzen, Czechoslovakia
Filed May 3, 1967, Ser. No. 635,819
Claims priority, application Czechoslovakia, May 7, 1966, 3,081/66
Int. Cl. H02m 1/18
U.S. Cl. 321—11            2 Claims

ABSTRACT OF THE DISCLOSURE

The thyristors of a selected one of first and second pluralities of rectifying branches are switched by control signals supplied to the control electrodes thereof to their conductive conditions and the thyristors of the other of the first and second pluralities of rectifying branches are simultaneously prevented from switching to their conductive conditions by a thyristor firing control circuit having inputs coupled to the control electrodes and the anode-cathode conducting paths of the thyristors and outputs connected to the control electrodes and the anode-cathode conducting paths of the thyristors. The thyristor firing control circuit controls the conductive condition of the thyristors by the control electrode current of the thyristors combined with the control signals.

BACKGROUND OF THE INVENTION

Field of the invention

The present invention relates to a thyristor firing control circuit. More particularly, the invention relates to a thyristor firing control circuit for a multiphase rectifier circuit.

Description of the prior art

The nonconductive condition of the thyristors of a multiphase rectifier circuit connected in groups of thyristors connected in polarity opposition to each other may be readily determined by pickup or sensing units. A suitable pickup may comprise, for example, a current measuring transformer which may be either a transformer unit or a transformer in combination with auxiliary rectifiers and measuring diodes for determining the magnitude of the current, as well as nonlinear resistors connected in series. A suitable current pickup may comprise a transductor or magnetic amplifier.

Known pickup arrangements for determining the nonconductive condition of the thyristors of a rectifier circuit have the disadvantage of being highly sensitive to the back current of the thyristors, which back current is in the range of hundredths of an ampere. The known pickup arrangements also have the disadvantage of having a rated current overload capacity in the range of hundreds of amperes and of requiring the inclusion of the aforementioned circuit components in the power circuit of the rectifier circuit.

SUMMARY OF THE INVENTION

The principal object of the present invention is to provide a new and improved thyristor firing control circuit for a multiphase rectifier circuit. The thyristor firing control circuit of the present invention avoids the disadvantages of the known pickup arrangement. The thyristor firing control circuit of the present invention is especially adapted for use in a multiphase rectifier circuit including a first plurality of rectifying branches having thryistors and a second plurality of rectifying branches having thyristors connected in polarity opposition to the thyristors of the first plurality of rectifying branches wherein the thyristor firing control circuit switches the thyristors of a selected one of the first and second pluralities of rectifying branches to their conductive conditions and simultaneously prevents the thyristors of the other of the first and second pluralities of rectifying branches from switching to their conductive conditions. The thyristor firing control circuit of the present invention eliminates the ancillary circuit components such as, for example, the current transformer, the non-linear resistors and the transductor, of the power circuit in the known arrangements thereby simplifying the power circuit. The thyristor firing control circuit of the present invention has the advantage over known arrangements utilizing a current measuring transformer in combination with an auxiliary rectifier and measuring diode of providing an indication signal of the current conducted by a thyristor, which indication signal varies in magnitude in the range of several tenths of a volt in accordance with the entire current conducted by the thyristors. In other cases, the indication signal varies by several orders of magnitude. The thyristor firing control circuit to the present invention therefore provides control signals which are especially suitable for further processing. The thyristor firing control circuit of the present invention is efficient, effective and reliable in operation.

In accordance with the present invention, the thyristor firing control circuit is included in a multiphase rectifier circuit which includes a first plurality of rectifying branches having thyristors and a second plurality of rectifying branches having thyristors connected in polarity opposition to the thyristors of the first plurality of rectifying branches. Each of the thyristors has an anode, a cathode and a control electrode for controlling the conductivity condition thereof and the anode and cathode of each of the thyristors provides an anode-cathode conducting path. The thyristor firing control circuit of the present invention comprises a control unit having an input coupled to the control electrodes and the anode-cathode conducting paths of the thyristors of the first plurality of rectifying branches, an input coupled to the control electrodes and the anode-cathode conducting paths of the thyristors of the second plurality of rectifying branches and a plurality of outputs each connected to the control electrode and the anode-cathode conducting path of a corresponding one of the thyristors of the multiphase circuit. The control unit switches by control signals in its outputs the thyristors of a selected one of the first and second pluralities of rectifying branches to their conductive conditions and simultaneously prevents the thyristors of the other of the first and second pluralities of rectifying branches from switching to their conductive conditions under the control of the control electrode current of the thyristors combined with the control signals of the control unit.

BRIEF DESCRIPTION OF THE DRAWING

In order that the present invention may be readily carried into effect, it will now be described with reference to the accompanying drawing, wherein.

DESCRIPTION OF THE PREFERRED EMBODIMENT

Figure 1:
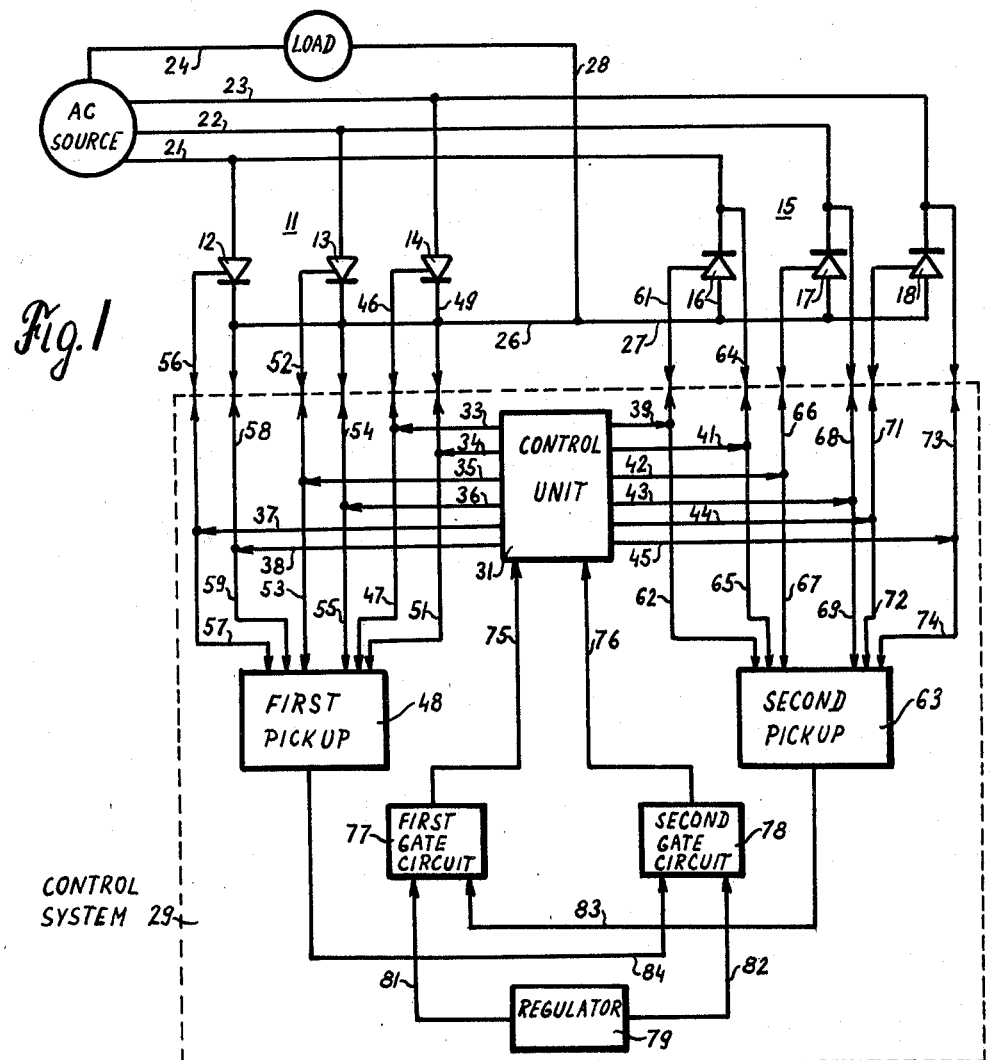
FIG. 1 is a block diagram of an embodiment of the thyristor firing control circuit of the present invention in a multiphase rectifier circuit.

In FIG. 1, a first plurality 11 of rectifying branches comprises a plurality of thyristors 12, 13 and 14 and is the positive rectifying branch of a multiphase rectifier circuit. A second plurality 15 of rectifying branches comprises a plurality of thyristors 16, 17 and 18 and is the negative rectifying branch of the multiphase rectifier circuit.

A three phase source 19 of AC electrical energy provides three phase AC voltage in output leads 21, 22 and 23. A neutral lead 24 from the AC source 19 is connected to one terminal of a load 25 which is a current load and may comprise, for example, a DC motor. The other terminal of the load 25 is connected to the output lead 26 of the first plurality 11 of rectifying branches and to the output lead 27 of the second plurality 15 of rectifying branches via the lead 28.

In accordance with the present invention, a control system 29 comprises a control unit 31 having a plurality of output leads 33, 34, 35, 36, 37, 38, 39, 41, 42, 43, 44 and 45. The output lead 33 is connected to the control electrode of the thyristor 14 via a lead 46 and to an input lead 47 of a first pickup 48, said control electrode and said input lead being connected to each other. The output lead 34 is connected to the cathode of the thyristor 14 via a lead 49 and to an input lead 51 of the first pickup 48, said cathode and said input lead being connected to each other.

The output lead 35 is connected to the control electrode of the thyristor 13 via a lead 52 and to an input lead 53 of the first pickup 48, said control electrode and said input lead being connected to each other. The output lead 36 is connected to the cathode of the thyristor 13 via a lead 54 and to an input lead 55 of the first pickup 48, said cathode and said input lead being connected to each other. The output lead 37 is connected to the control electrode of the thyristor 12 via a lead 56 and to an input lead 57 of the first pickup 48, said control electrode and said input lead being connected to each other. The output lead 38 is connected to the cathode of the thyristor 12 via a lead 58 and to an input lead 59 of the first pickup 48, said cathode and said input lead being connected to each other.

The output lead 39 is connected to the control electrode of the thyristor 16 via a lead 61 and to an input lead 62 of a second pickup 63, said control electrode and said input lead being connected to each other. The output lead 41 is connected to the cathode of the thyristor 16 via a lead 64 and to an input lead 65 of the second pickup 63, said cathode and said input lead being connected to each other. The output lead 42 is connected to the control electrode of the thyristor 17 via a lead 66 and to an input lead 67 of the second pickup 63, said control electrode and said input lead being connected to each other. The output lead 43 is connected to the cathode of the thyristor 17 via a lead 68 and to an input lead 69 of the second pickup 63, said cathode and said input lead being connected to each other.

The output lead 44 is connected to the control electrode of the thyristor 18 via a lead 71 and to an input lead 72 of the second pickup 63, said control electrode and said input lead being connected to each other. The output lead 45 is connected to the cathode of the thyristor 18 via a lead 73 and to an input lead 74 of the second pickup 63, said cathode and said input lead being connected to each other.

The control unit 31 has input leads 75 and 76. The control unit 31 may comprise any suitable triggered signal source such as, for example, a bistable multivibrator or flip flop. When an input signal is supplied to the control unit 31 via the input lead 75, said control unit provides a control signal at its output leads 33, 34, 35, 36, 37 and 38 and fires the thyristors 12, 13 and 14 of the first plurality of rectifying branches. When an input signal is supplied to the control unit 31 via the input lead 76, said control unit provides a control signal at its output leads 39, 41, 42, 43, 44, and 45 and fires the thyristors 16, 17 and 18 of the second plurality of rectifying branches.

A suitable bistable multivibrator which may be utilized as the control unit 31 is disclosed in pages 113 to 124 of a textbook entitled, "Computer Basics," volume 6, "Solid-State Computer Circuits," by Technical Education and Management, Inc., Howard W. Sams & Co., Inc., The Bobbs-Merrill Company, Inc., Indianapolis and New York, first edition, 1962.

The control unit 31 thus controls the firing sequence of the thyristors 12, 13 and 14 of the first plurality 11 of rectifying branches when an input signal is supplied to the input lead 75 of said control unit 31 and the firing sequence of the thyristors 16, 17 and 18 of the second plurality 15 of rectifying branches when an input signal is supplied to the input lead 76 of said control unit 39. In the first case is an input signal supplied to the input lead 75 via a first gate circuit 77 which has an output connected to said input lead. In the second case is an input signal supplied to the input lead 76 via a second gate circuit 78 which has an output connected to said input lead.

The input signals supplied to the input leads 75 and 76 of the control unit 31 are provided by a regulator 79. The regulator 79 may comprise any suitable source of input signals for triggering the control unit 31 to provide control signals for firing the thyristors of the first and second pluralities of thyristors. The regulator 79 may comprise, for example, any suitable pulse generator or program-controlled signal source. The signals provided by the regulator 79 are supplied via an output lead 81 to a first input of the first gate circuit 77 and via an output lead 82 to a first input of the second gate circuit 78.

The first gate circuit 77 has a second input connected to the output of the second pickup 63 via a lead 83. The second gate circuit 78 has a second input connected to the output of the first pickup 48 via a lead 84. Each of the first and second gate circuits 77 and 78 is the same as the other and may comprise any suitable circuit arrangement for transferring or conducting a signal supplied to its first input when no signal is supplied to its second input or when its second input is not energized.

A suitable circuit arrangement for each of the first and second gate circuits 77 and 78 may thus comprise an AND circuit of a type described in pages 177 to 184 of a textbook entitled, "Computer Basics," volume 3, "Digital Computers, Mathematics and Circuitry," by Technical Education and Management, Inc., Howard W. Sams & Co., Inc., The Bobbs-Merrill Company, Inc., Indianapolis and New York, first edition, 1962, and having first and second inputs, in combination with a NOT circuit connected in the second input of the AND circuit. A suitable NOT circuit may comprise a NOT circuit of the type described in pages 173 to 177 of the last mentioned textbook, "Digital Computers, Mathematics and Circuitry."

Each of the first and second pickups 48 and 63 is the same as the other and may comprise any suitable arrangement for providing at its output a signal when the currents in its inputs are of sufficient magnitude to indicate that the thyristors connected to said inputs are in their conductive condition. A suitable arrangement for each of the first and second pickups 48 and 63 may thus comprise a current responsive component such as, for example, a magnetic amplifier or saturable core.

The first pickup 48 provides at its output a signal when at least one of the thyristors 12, 13 and 14 of the first plurality 11 of positive rectifying branches is in its conductive condition, as indicated by the current in the input leads 47, 53 and 57 of said first pickup. The current in the input leads 47, 53 and 57 is a combination of the control electrode current of the thyristors 12, 13 and 14 and the control signals supplied by the control unit 31 when the second pickup 63 provides no signal at its output or in the absence of a signal at the output of the second pickup 63. The absence of a signal at the output of the second pickup 63 indicates the nonconductive condition of the second plurality 15 of negative rectifying branches. The signal provided by the first pickup 48 is supplied to the second input of the second gate circuit 78 via the lead 84.

The second pickup 63 provides at its output a signal when at least one of the thyristors 16, 17 and 18 of the second plurality 15 of negative rectifying branches is in its conductive condition, as indicated by the current in the input leads 62, 67 and 72 of said second pickup. The current in the input leads 62, 67 and 72 is a combination of the control electrode current of the thyristors 16, 17 and 18 and the control signals supplied by the control unit 31 when the first pickup 48 provides no signal at its output or in the absence of a signal at the output of the first pickup 48. The absence of a signal at the output of the first pickup 48 indicates the nonconductive condition of the first plurality 11 of positive rectifying branches. The signal provided by the second pickup 63 is supplied to the second input of the first gate circuit 77 via the lead 83.

Figure 2:
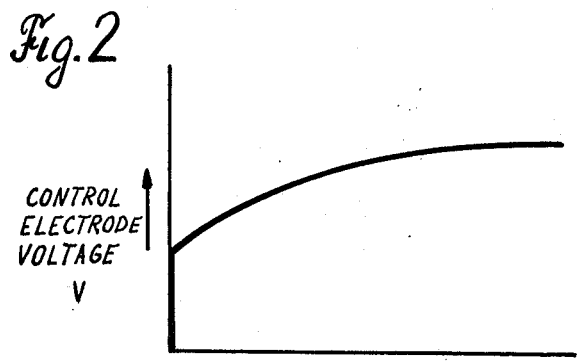
FIG. 2 is a graphical presentation of the current conducted through a thyristor versus the voltage at the control electrode of the thyristor during current conduction therethrough.

The current in the control electrode of a thyristor is the firing current when the firing circuit is closed. When the thyristor is in its conductive condition, the current flow between the anode and the cathode of the thyristor produces a voltage at the control electrode of said thyristor in accordance with the magnitude of said current flow. In FIG. 2, the abscissa represents the current I in amperes flowing through the thyristor when the thyristor is in its conductive condition, and the ordinate represents the voltage V in volts produced at the control electrode of said thyristor.

The voltage V of FIG. 2 varies within a range of several tenths of a volt in accordance with and in dependence upon the magnitude of the current I of FIG. 2, which current varies within a range of $10^{-1}$ to several $10^2$ amperes. When a control pulse is supplied to the control electrode by the control unit 31, the voltage of the control pulse is added to the voltage V of FIG. 2, produced at the control electrode by current flowing through the thyristor. The voltage condition of the control electrode is thus an indication of the conductive condition of the thyristor. Since the first pickup 48 is responsive to the voltage condition of the control electrodes of the thyristors 12, 13 and 14 of the first plurality 11 of positive rectifying branches, said first pickup indicates the conductive condition of said thyristors. Since the second pickup 63 is responsive to the voltage condition of the control electrodes of the thyristors 16, 17 and 18 of the second plurality 15 of negative rectifying branches, said second pickup indicates the conductive condition of said thyristors.

Only one of the first and second pluralities of rectifying branches 11 and 15 may conduct current at a time in order to prevent short-circuiting between said rectifying branches. The plurality of rectifying branches in conductive condition is determined by the direction of current flow desired through the load 25. If the load 25 is a DC motor, the first plurality 11 of positive rectifying branches are made conductive if the motor is desired to rotate in one of a clockwise and counterclockwise direction, and the second plurality 15 of negative rectifying branches are made conductive if said motor is desired to rotate in the other of a clockwise and counterclockwise direction.

If the first plurality 11 of rectifying branches is selected to be conductive, for example, the second plurality 15 of rectifying branches is nonconductive. In this case, the selection is accomplished by the signals provided by the regulator 79 and supplied to the first gate circuit 77 via the lead 81. The first pickup 48 thus provides a signal in its output and the second pickup 63 provides no signal in its output. The signals provided by the regulator 79 are supplied to the first and second gate circuits 77 and 78 via the leads 81 and 82. The first gate circuit 77 is switched to its conductive condition because in the absence of a signal at the second input of the first gate circuit 77, the NOT circuit included in said first gate circuit produces output signals energizing the AND circuit of the first gate circuit 77 and thus switching it to its conductive condition by signals in both its inputs and conducts the signal from the regulator 79 from the lead 81 to the lead 75 into the control unit 31. The control unit 31 provides control pulses to the control electrodes of the thyristors 12, 13 and 14 to maintain the first plurality 11 of rectifying branches conductive.

At the same time that it maintains the first plurality 11 of rectifying branches in their conductive condition, the thyristor firing control circuit or control system 29 of the present invention prevents the second plurality 15 of rectifying branches from switching to their conductive condition. This is accomplished by the signal supplied from the first pickup 48 to the second input of the second gate circuit 78 via the lead 84, which signal switches said second gate circuit to its nonconductive condition. Since there is a signal in the second input of the second gate circuit 78, the NOT circuit included in said second gate circuit prevents an output signal. The AND circuit of the second gate circuit 78 is thus switched to its nonconductive condition, since it then has a signal in its first input and no signal in its second input, and prevents the transfer of the signal from the regulator 79 from the lead 82 to the lead 76. There are thus no control pulses supplied to the control electrodes of the thyristors 16, 17 and 18 by the control unit 31 so that the second plurality 15 of rectifying branches is maintained nonconductive.

If the second plurality 15 of rectifying branches is selected to be conductive, for example, the signals provided by the regulator 79 are supplied to the second gate circuit 78 via the lead 82. The second pickup 63 thus provides an output signal and the first pickup 48 provides no output signal. Since in the absence of a signal at the second input of the second gate circuit 78, the NOT circuit of the second gate circuit 78 produces an output signal which switches the AND circuit of said second gate circuit to its conductive condition since said AND circuit then has signals in both its inputs. The second gate circuit 78 thus conducts the signal from the regulator 79 to the control unit 31 via the leads 82 and 76. The signal in the output of the second pickup 63 switches the first gate circuit 77 to its nonconductive condition, similarly to the aforedescribed control of the first plurality 11 of rectifying branches, and maintains the first plurality 11 of rectifying branches in its nonconductive condition.

Figure 3:
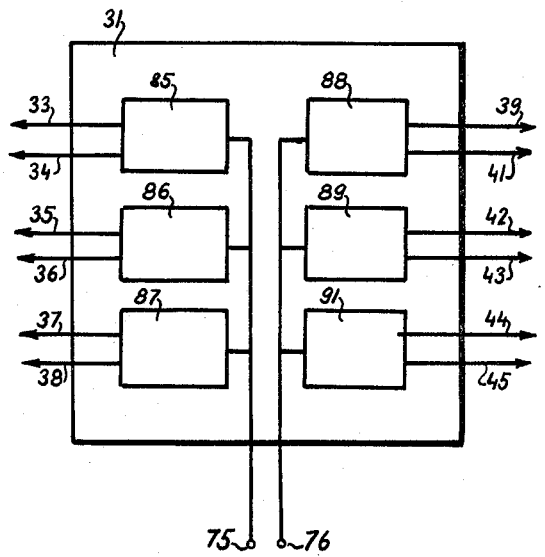
FIG. 3 is a block diagram of a control unit which may be utilized as the control unit 31 of the circuit of FIG. 1.
Figure 4:
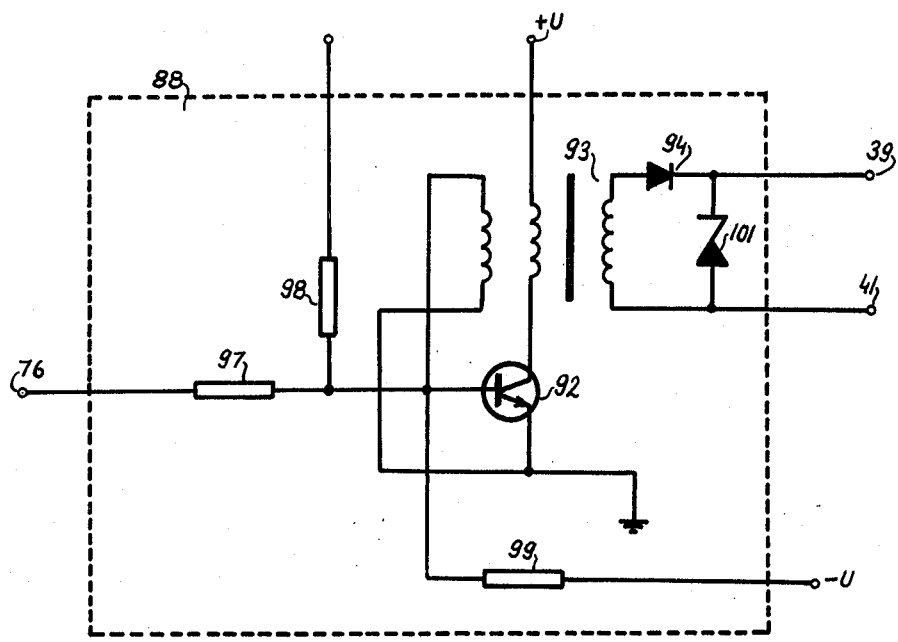
FIG. 4 is a circuit diagram of each of the blocks of the control unit of FIG. 3.

As previously mentioned, the regulator 79 (FIG. 5) comprises any suitable source of input signals for triggering the control unit 31 to provide control signals for firing the thyristors. If the regulator 79 is not provided with such means, the source of signals must be included in the control unit 31. In such a case, as shown in FIG. 3, the control unit 31 comprises six equal control circuits, three of which are connected to the input lead 75 in order to supply control signals to thyristors 12, 13, 14, and the remaining three of which are connected to the input lead 76, supplying control signals to thyristors 16, 17, 18 of the second plurality 15 of rectifying branches. Such a control circuit (FIG. 4) of the control unit (FIG. 3) can be substantially a blocking oscillator comprising a transistor and a pulse transformer. Let us suppose that the thyristor 16 is supplied with signals from the control circuit. The voltage on the input lead 76 is compared by resistors 97 and 98 at the base of the transistor 92 with a sawtooth voltage derived from the output lead 21 (FIG. 1), to which the thyristor 16 is connected. Oscillations are generated within each positive half cycle, on the transistor and on the pulse transformer 93. The duration of the oscillations depends upon the magnitude of the input voltage on the input lead 76. Thus the firing angle of the thyristor 16 is controlled. The positive half waves of these oscillations are supplied via a diode 94 by the output lead 39 to the thyristor 16. In order to limit voltage surges, a Zener diode 101 may be connected between the output leads 39 and 41.

Figure 5:
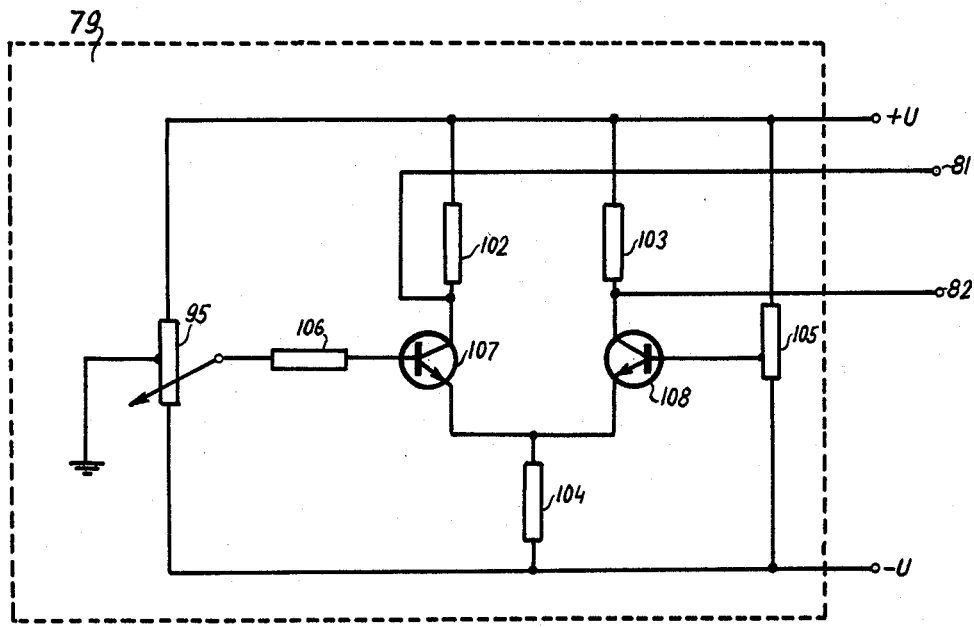
FIG. 5 is a circuit diagram of a regulator which may be utilized as the regulator 79 of the circuit of FIG. 1.

As shown in FIG. 5, regulator 79 can be a DC amplifier comprising a pair of transistors 107 and 108 with collector resistances. A negative feedback between both transistors 107 and 108 determines at resistor 102 or 103 whether the output signals on leads 81 and 82 are symmetrical.

Figure 6:
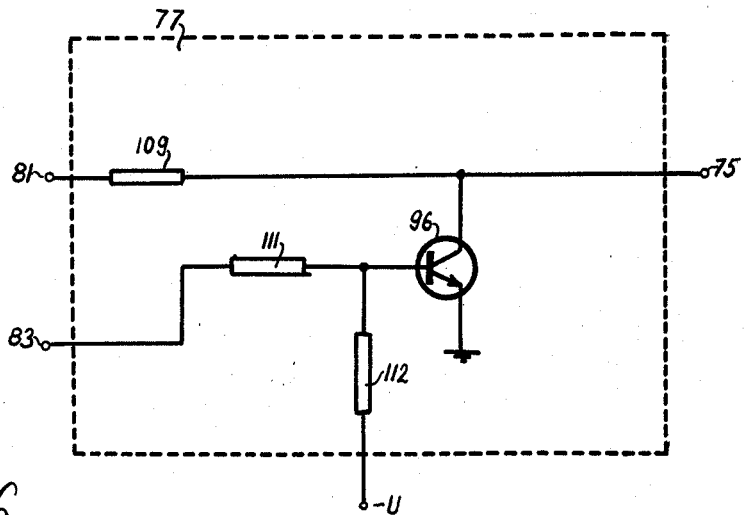
FIG. 6 is a circuit diagram of a gate circuit which may be utilized as each of the first and second gate circuits 77 and 78 of the circuit of FIG. 1.

Since the output signals on leads 81 and 82 are continuous, the first and second gate circuits 77 and 78 have to be provided. Such gate circuit may comprise, as shown in FIG. 6, a transistor, which short-circuits the output on the input lead 75 or 76, respectively, leading to the control unit 31. In order to limit the current through the transistor 96, if the transistor is driven, a limiting resistor 109 is connected between the input lead 81 or 82, respectively, and the collector of said transistor.

The control signals from the second pickup 63 are supplied via a lead 83 and an additional resistor 111 to the base of the transistor 96 of the first gate circuit 77. Similar arrangements are provided with the first pickup 48 and the second gate circuit 78.

Figure 7:
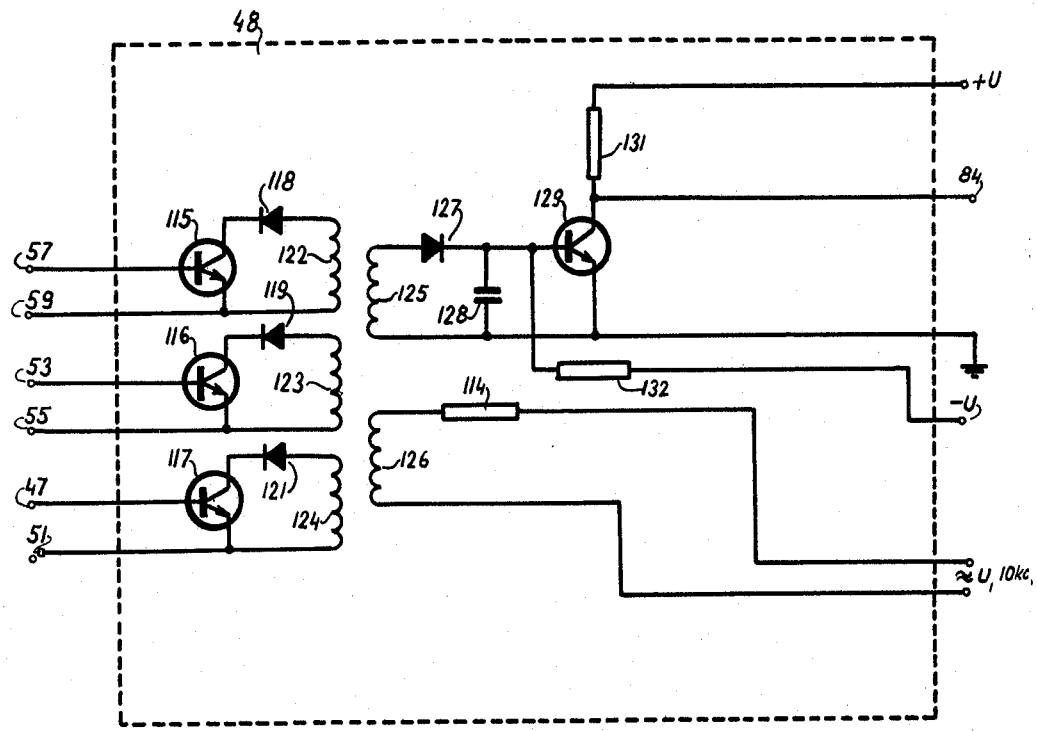
FIG. 7 is a circuit diagram of an embodiment of a pickup which may be utilized as each of the first and second pickups 48 and 63 of the circuit of FIG. 1.
Figure 8:
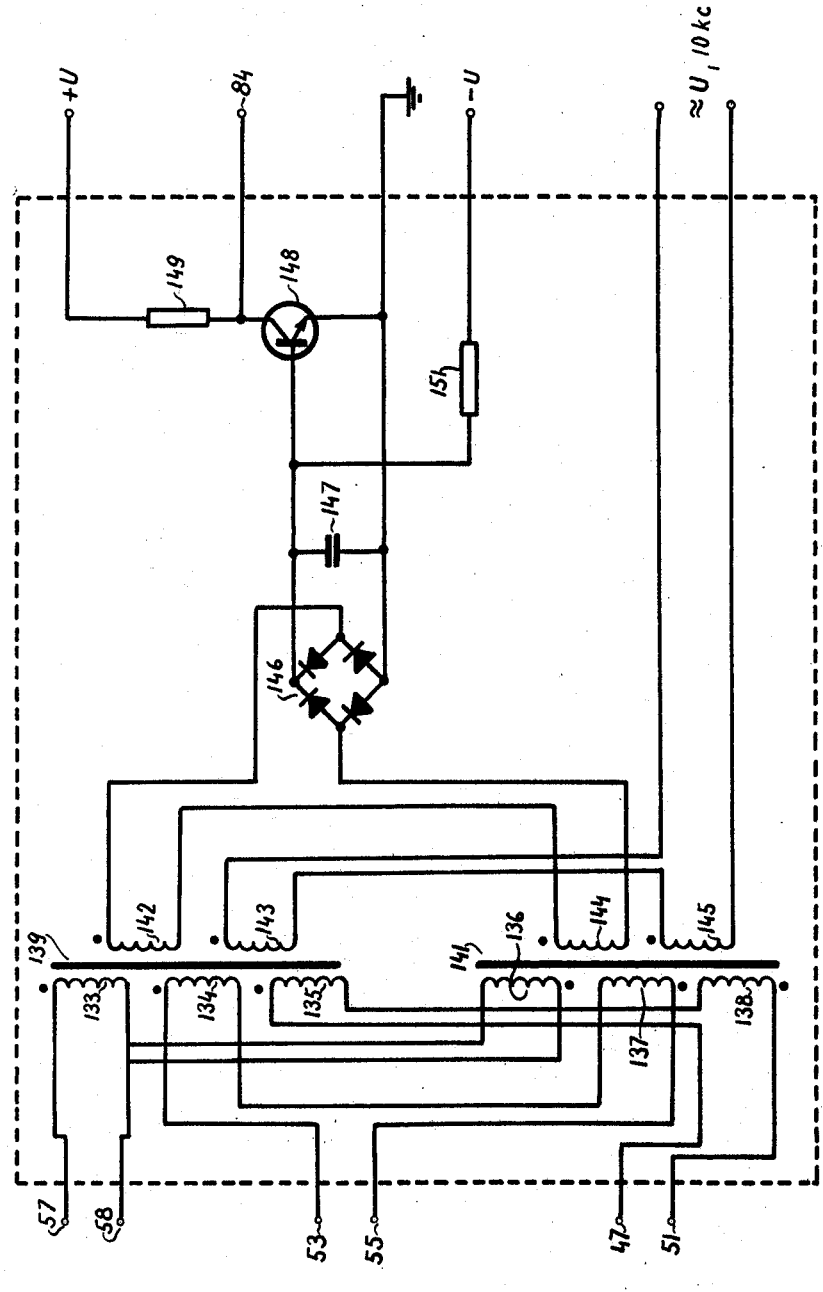
FIG. 8 is a circuit diagram of another embodiment of a pickup which may be utilized as each of the first and second pickups 48 and 63 of the circuit of FIG. 1.

The first and second pickups 48 and 63 may comprise, for example, transformers, as shown in FIG. 7, or magnetic amplifiers, as shown in FIG. 8.

In FIG. 7 the circuit for the first pickup 48 comprises a transformer with a field winding 126, an output winding 125 and three input windings 122, 123 and 124. A switching transistor 115, 116 and 117, respectively, is connected in parallel to a corresponding one of each of the input windings 122, 123 and 124, with the emitter of each transistor connected to the collector thereof via a polarization diode 118, 119 and 121, respectively. The input lead 57 is connected to the base of the first switching transistor 115, the input lead 59 is connected to its emitter. Similarly, the input lead 53 is connected to the base of the second transistor 116, the input lead 55 to its emitter, and the input lead 47 is connected to the base of the third transistor 117 and the input lead 51 to its emitter. The field winding 126 of the transformer is supplied with high frequency current of, for example, 10 kc., which excites high frequency voltages in all three input windings 122, 123 and 124, and in the output winding 125. The combination of the output winding 125 of the transformer with a diode 127 and a filter capacitor 128 represents a source of DC opening signal for the base of an output transistor 129 connected in common emitter connection. The base of said output transistor 129 is connected via a resistor 132 to the working bias. The operating point of the output transistor 129 is adjusted so that it remains closed as long as no opening DC signal is present. The collector of the output transistor 129 is connected via a collector resistor 131 to a source of collector voltage, whereby said collector resistor forms together with the collector-emitter path of said output transistor a divider of the collector voltage. The output signal is derived via a lead 84.

If input signals are present at the input leads 57 and 59 the corresponding switching transistor 115 becomes conductive, a load is applied to the field winding 126 of the transformer and the induced alternating voltage drops to zero.

The base of the output transistor 129 is thus closed without any opening DC signal. A DC signal is produced in the collector-emitter path of the output transistor 129, which is part of said voltage divider. The DC signal is the output signal of the first pickup 48, indicating that the thyristor, such as 12, is in a conductive state. In this case, the second gate circuit 78 blocks the second plurality of rectifying branches 15.

The firing of the thyristors of the second plurality of rectifying branches proceeds in the same manner.

Another embodiment of the pickup, as shown in FIG. 8, uses a magnetic amplifier comprising a first transformer 139 and a second transformer 141 each with a field winding 143 and 145, respectively, supplied with high frequency current of, for example 10 kc. Each of the transformers 139 and 141 has three input windings 133, 134 and 135 and 136, 137 and 138, respectively, and an output winding 142 and 144, respectively. Both output windings are connected in series so that the output signals induced therein are added prior to being rectified and filtered. This causes the switching of an output transistor 148 to its conductive condition, whereby the output signal transmitted via lead 84 from a voltage divider 149 is equal to zero. A signal on any of the pairs of input leads 57, 59 or 53, 55 or 47, 51 causes a saturation of the cores of both transformers, since the input windings of both transformers 139 and 141 are connected in series.

The saturation of the cores of both transformers causes a considerable drop of the voltage on the output windings 142 and 144 of both transformers, so that the base of the output transistor 148 becomes more negative, thereby switching said transistor to its nonconductive condition. A positive output signal is provided on lead 84.

While the invention has been described by means of specific examples and in a specific embodiment, we do not wish to be limited thereto, for obvious modifications will occur to those skilled in the art without departing from the spirit and scope of the invention.

All transistors used are of the NPN type.

We claim:

1. In a multiphase rectifier circuit including a first plurality of rectifying branches having thyristors and a second plurality of rectifying branches having thyristors connected in polarity opposition to the thyristors of said first plurality of rectifying branches, each of said thyristors having an anode, a cathode and a control electrode for controlling the conductivity condition thereof, the anode and cathode of each of said thyristors providing an anode-cathode conducting path, a thyristor firing control circuit comprising a control unit having a first input, a second input and a plurality of outputs each connected to the control electrode of a corresponding one of the thyristors of said multiphase circuit for switching by control signals in its outputs the thyristors of a selected one of said first and second pluralities of rectifying branches to their conductive conditions upon the supply of an input signal to one of said first and second inputs and simultaneously preventing the thyristors of the other of said first and second pluralities of rectifying branches from switching to their conductive conditions upon the prevention of the supply of an input to the other of said first and second inputs under the control of the control signals of said control means, first coupling means comprising a first gate circuit having an output connected to the first input of said control unit, a first input and a second input coupled to the control electrodes of the thyristors of said second plurality of rectifying branches for controlling the supply of an input signal to the first input of said control unit and second coupling means comprising a second gate circuit having an output connected to the second input of said control unit, a first input and a second input coupled to the control electrodes of the thyristors of said first plurality of rectifying branches for controlling the supply of an input signal to the second input of said control unit, a first pickup for determining the conductive condition of the thyristors of said first plurality of rectifying branches and a second pickup for determining the conductive condition of the thyristors of said second plurality of rectifying branches, the second input of said second gate circuit being coupled to the control electrodes of the thyristors of said first plurality of rectifying branches through said first pickup and the second input of said first gate circuit being coupled to the control electrodes of the thyristors of said second plurality of rectifying branches through said second pickup, each of said first and second pickups supplying a signal to the gate circuit connected to it when the corresponding thyristors are in conductive condition and each said signal blocks the gate circuit to which it is supplied; and a source of signals having output means connected to the first input of each of said first and second gate circuits for supplying input signals to said first and second gate circuits.

2. A multiphase rectifier circuit as claimed in claim 1, wherein the first input of the control unit of the thyristor firing control circuit is coupled to the control electrodes and the anode-cathode conducting paths of the thyristors of said first pluarlity of rectifying branches, and the second input of said control unit is coupled to the control electrodes and the anode-cathode conducting paths of the thyristors of said second plurality of rectifying branches and each of said plurality of outputs is connected to the control electrode and the anode-cathode conducting path of a corresponding one of the thyristors of said multiphase circuit.

References Cited

UNITED STATES PATENTS

| | | | |
|---|---|---|---|
| 3,268,820 | 8/1966 | Newman et al. | 307—269 X |
| 3,391,327 | 7/1968 | Pelly | 321—27 |
| 3,399,337 | 8/1968 | Stone | 321—27 X |
| 3,400,321 | 9/1968 | LaFuze | 321—11 X |

OTHER REFERENCES

G.E. Silicon Controlled Rectifier Manual 2nd ed., copyright 1961 (Dec. 29, 1961), pp. 4 and 5 relied upon.

LEE T. HIX, Primary Examiner

G. GOLDBERG, Assistant Examiner

U.S. Cl. X.R.

307—243, 252, 297; 321—19, 27; 323—22, 24